Oct. 2, 1956  M. LILIENSTEIN  2,765,433
MAGNETO-INDUCTION COUNTER
Filed Dec. 4, 1953
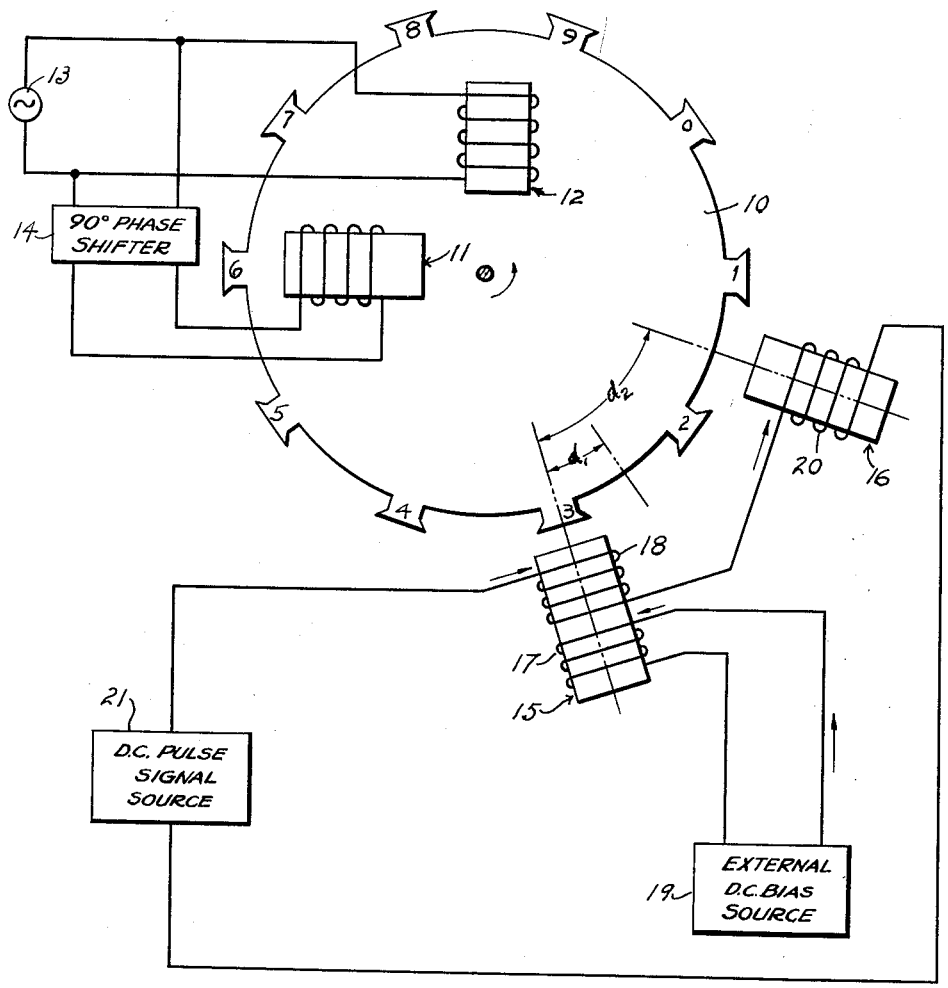
INVENTOR.
MANFRED LILIENSTEIN
BY
R. P. Morris
ATTORNEY.

United States Patent Office 2,765,433
Patented Oct. 2, 1956

2,765,433

MAGNETO-INDUCTION COUNTER

Manfred Lilienstein, Paramus, N. J., assignor to International Telephone and Telegraph Corporation, New York, N. Y., a corporation of Maryland Application December 4, 1953, Serial No. 396,274

4 Claims. (Cl. 318—46)

This invention relates to pulse counters, and more especially it relates to pulse counters of the rotary electromotive kind.

A principal object of the invention is to provide an improved rotary magneto-induction pulse counter which is free from rubbing contacts and has a fast response to the applied pulses to be counted.

Another object is to provide an improved pulse counting system of the rotary electromagnetic ratchet kind.

Another object is to provide a rotary electromotive pulse counter having a novel electric ratchet control which is rapidly responsive to successive applied pulses to be counted.

A feature of the invention resides in the novel combination of a multi toothed magnetic rotor having a plurality of electromagnetic field producing elements, some of which form a pulse controlled electric ratchet, while others provide a constant rotary torque for the rotor.

Another feature relates to an improved electromotive rotary pulse counter having a toothed magnetic rotor, a pair of electromagnets displaced in predetermined relation to the spacing of the rotor teeth, one of said magnets having a direct current biasing winding which normally locks the rotor in its last set rotary position and also has a pulse receiving winding. The other electromagnet has a winding which is in series with the said pulse receiving winding of the first electromagnet. The relative directions of the windings of both said electromagnets are such as to provide an accurate and rapidly responsive electric ratchet effect for advancing the rotor a fixed angular distance for each received pulse.

Another feature relates to an improved induction motor of the magnetic toothed rotor kind having an alternating current field producing means to apply a steady torque to the rotor, and a pair of direct current field producing means one of which normally, that is in the absence of received direct current pulses, holds the rotor at a fixed setting but both of which cooperate to advance the rotor accurately a predetermined angular distance for each successive received pulse applied to said direct current field producing means.

A further feature relates to the novel organization, arrangement and relative location of parts, which cooperate to provide a simplified and improved magneto-induction pulse counting device.

Other features and advantages will appear from the ensuing descriptions and the appended claims.

In describing the present invention reference is had to the accompanying drawing which is a schematic and block diagram of a system embodying my invention.

By way of example, there is shown in the drawing a toothed wheel or disc 10 of magnetic material, having, for example, a series of ten magnetic salient teeth numbered 0 to 9 and located in equi-spaced relation around the margin of the wheel. Mounted adjacent the wheel 10 are two electromagnets 11 and 12 for producing a rotating field acting on the wheel 10. The windings of magnets 11 and 12 are connected to a suitable source 13 of alternating current. The energization of one winding, for example that of magnet 11 being shifted 90 degrees, for example by the phase shifting network 14, with respect to the energization of the winding of the other magnet 12. The electromagnets 11 and 12 are mounted at right angles to each other and as a result the wheel or rotor 10 is subjected to a rotating magnetic field tending to rotate it with a constant torque, for example in a counterclockwise direction. The principle of operation is analagous to an eddy current motor or watt-hour meter: i. e. the rotating magnetic field produces a rotating eddy current in the disc 10. This produces a torque and causes the disc to rotate in a given direction.

Mounted adjacent the edge of the rotor, but spaced from the magnetic teeth thereof, are two additional electromagnets 15, 16. The magnets 15 and 16 are located with their center lines, represented by the dot-dash lines in the drawing, spaced apart a distance $d_2$, which should be an odd multiple of the distance $d_1$, the latter distance representing one-half the spacing between successive rotor teeth. The core of magnet 15 has two separate windings 17 and 18. Winding 17 is connected to a suitable direct current source 19 and provides a predetermined steady biasing field between the magnet 15 and the rotor teeth. The second winding 18 is connected in series with the winding 20 of the magnet 16, and both these series connected windings are connected to a suitable direct current pulse signal source 21, the pulses from which are to be counted.

For the purpse of explanation, it will be assumed initially that no pulses are applied from source 21. Accordingly, the energization of winding 17 from source 19 causes magnet 15 to exert an attractive force on the #3 tooth of the rotor. It is assumed, of course, that the rotor 10 in its last setting is as shown in the drawing with the #3 tooth in approximate alignment with the center of magnet 15. By adjusting the normal biasing magnetization of winding 17 from source 19 the above mentioned attractive force can be made sufficiently strong with respect to the rotating field of magnets 11 and 12 that the rotor 10 remains locked in its previously set position.

It will now be assumed that a pulse is applied from source 21 to the windings 18 and 20. The direction of the winding of the coil 18 is opposite to the direction of the winding of coil 17. By means of a suitable amplifier (not shown), the input pulse when thus applied to winding 18 neutralizes the magnetization of winding 17, thus demagnetizing the core of magnet 15 so that it no longer attracts tooth #3. Since winding 20 is in series with winding 18, this pulse energizes the core of magnet 16, which thereupon attracts tooth #2. While at the same time there is an attraction between magnet 16 and tooth #1, the rotor 10 is constrained to move in the counterclockwise direction because of the constant counterclockwise torque produced by magnets 11 and 12. Therefore, the rotor 10 is given a rotary impulse in the counterclockwise direction because of the short duration of the pulse. When it terminates, the winding 17 again takes control and attracts tooth #4 until this latter tooth becomes aligned with the magnet 15. The rotor 10 therefore stays locked in this position pending receipt of the next pulse.

A similar action occurs for each succeeding pulse from source 21. It should be understood, of course, that the energization of winding 17 by the biasing source 19 should be designed so as to overcome the revolving field produced by magnets 11 and 12, and the field produced by winding 18 must be approximately equal and opposite to the field produced by winding 17. Similarly, the field produced by winding 20 is designed so that it is greater than the difference of the fields produced between windings 17 and 18.

While one particular embodiment has been described herein, various changes and modifications may be made therein without departing from the spirit and scope of the invention.

What is claimed is:

1. A pulse counter of the rotary electromotive kind, comprising in combination a magnetic toothed rotor, electromagnetic field means tending to exert a constant rotary torque on said rotor in one rotary direction, said rotor being within the field of, and directly acted on by, said field means, a pair of electromagnets, one of said electromagnets having a pair of differential magnetizing windings one of which is a rotor locking winding, the other electromagnet having a single rotor stepping winding, means connecting one winding of said pair of windings in series with said single winding, said series connected windings being connected to a source of direct current impulses to be counted, and a source of direct current connected to said locking winding.

2. A pulse counter, according to claim 1, in which said electromagnetic field means comprises a plurality of electromagnets energized in 90 degrees phase displaced relation to set up a rotating magnetic field of predetermined constant torque which, however, is less than the tractive force exerted on said rotor by said locking winding.

3. A pulse counter device, according to claim 1, in which said pair of electromagnets are spaced apart with their magnetic axes a distance which is an odd multiple of one-half the distance between successive teeth on said rotor.

4. A pulse counter of the magneto induction rotary kind comprising in combination a magetic toothed wheel, means to set up a rotating magnetic field tending to rotate said wheel in one direction, a first electromagnet having a first and second winding, a second electromagnet having a winding connected in series with said first winding and arranged to be connected to a source of direct current signal impulses, said second winding arranged for connection to a source of steady direct current, said second winding when alone energized locking said wheel in its previously set position, said first and second windings when simultaneously energized substantially neutralizing each other and for causing said second electromagnet and said rotating field means to advance said wheel to its next setting.

References Cited in the file of this patent
UNITED STATES PATENTS

| | | |
|---|---|---|
| 1,849,645 | Stoller | Mar. 15, 1932 |
| 2,677,090 | Fleming-Williams et al. | Apr. 27, 1954 |